Sept. 21, 1954   F. W. TANNER, JR., ET AL   2,689,854
ACETOPYRROTHINE AND PREPARATION THEREOF
Filed May 3, 1950
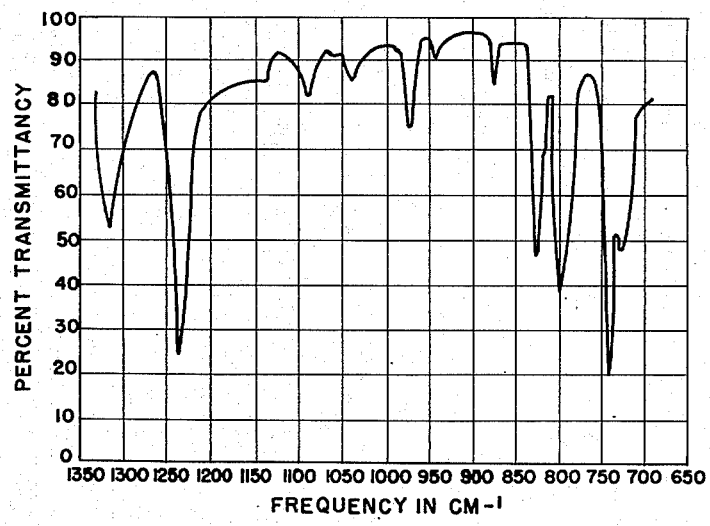
INVENTORS:
FRED W. TANNER, JR.,
JACOB W. DAVISSON,
ALEXANDER C. FINLAY
& JASPER H. KANE,
BY
*Arthur G. Connolly*
THEIR ATTORNEY Patented Sept. 21, 1954

2,689,854

UNITED STATES PATENT OFFICE 2,689,854

ACETOPYRROTHINE AND PREPARATION THEREOF

Fred W. Tanner, Jr., Baldwin, Jacob W. Davisson, Floral Park, Alexander C. Finlay, Long Island City, and Jasper H. Kane, Garden City, N. Y., assignors to Chas. Pfizer & Co., Inc., New York, N. Y., a corporation of Delaware Application May 3, 1950, Serial No. 159,856

5 Claims. (Cl. 260—327)

This invention is concerned with a new and useful antibiotic called acetopyrrothine (also known by the registered trade-make "Thiolutin") and with the production of this valuable substance. More particularly it relates to processes for its production by fermentation, methods for its recovery and concentration from crude solutions including the fermentation broths, purification thereof, and the preparation of the antibiotic in pure, crystalline form. The invention also includes the antibiotic in dilute solutions, as crude concentrates and in its pure, crystalline form.

Our new antibiotic is formed during the cultivation under controlled conditions of a number of newly isolated strains of the species of microorganism known as *Streptomyces albus*. The description of the cultural characteristics of one of these new strains of *S. albus* is given in tabular form below. (The colors where "R" is written are those of Ridgway "Color Standards and Nomenclature.") Readings are based on six tubes or plates, except where otherwise noted.

| Medium | Amount of Growth | Color | | Remarks |
|---|---|---|---|---|
| | | Aerial Mycelium and Spores | Soluble Pigment | |
| Glucose-Asparagine Plates | Moderate to Good. | White with traces of Pale Vinaceous Fawn (R) where sporulated. | Faint yellow | Colony elevated; edge smooth; surface wrinkled; sporulation very slight; reverse light brownish yellow. Spores borne in straight or wavy chains that develop in clusters; spores 0.65 x 0.9µ, oval to short cylindrical. No spirals. On dilution plates colonies very similar to each other. |
| Gelatin | Moderate | Slight sporulation Pale Brownish Vinaceous (R), rest of aerial mycelium white. | Yellow | Reverse light brown. Moderate liquefaction; diameter of zones 16, 18, 10, 13, 15, 11 mm. |
| Milk (Pasteurized milk from which most of cream was removed was steamed on three successive days). | Good | | | Very slight coagulation in 13 days. No visible peptonization. pH unchanged.<br><br>Amino nitrogen (Van Slyke)<br>*7 days*<br>Control _____ 0.90 mg./ml.<br>S. albus _____ 1.01 mg./ml.<br>*13 days*<br>Control _____ 0.52 mg./ml.<br>S. albus _____ 0.57 mg./ml.<br><br>Total N (Kjeldahl)<br>*7 days*<br>Control _____ 5.17 mg./ml.<br>S. albus _____ 5.59 mg./ml.<br>*13 days*<br>Control _____ 4.76 mg./ml.<br>S. albus _____ 1.95 mg./ml. |
| Glucose Agar | do | Sporulation good to moderate, Pale Quaker Drab (R). | Brown | Reverse dark brown. |
| Nutrient Agar | Moderate | Mostly white but some Pallid Mouse Gray (R) sporulation. | Faint Yellow | Reverse light brown; colony circumferentially fissured. |
| Potato Plug | Good | Sporulation moderate, near Pale Olive Buff (R). | Light yellowish-brown to dark brown. | |
| Calcium malate | Poor | White, fluffy aerial mycelium; sporulation nearly lacking. | None | |
| Starch plates | do | Flat, white aerial mycelium; no spores. | do | Reverse brown. Moderate hydrolysis: zones 14 mm. in diameter. |
| Synthetic Agar | do | White, dull waxy; no aerial mycelium or spores. | None | Reverse white. |
| Cellulose | None | | | |
| Emerson's Agar | Good | Mostly flat, white, aerial mycelium, slight Pallid Mouse Gray (R) sporulation in center. | Orange brown | Reverse brown. |
| Dextrose Nitrate broth | | | | No reduction. |

This new strain of *S. albus* has been shown to differ in a number of tests from the description of this species given by Waksman in Bergey's Manual. The following table summarizes these differences, as well as the corresponding cultural characteristics of two strains of *S. albus* obtained from the American Type Culture Collection (ATCC 618 and ATCC 3004). It will be noted that this new strain differs particularly with respect to pigment formation. A culture of the new organism has been deposited with the Fermentation Division of the Northern Regional Research Laboratory at Peoria, Illinois, and has been added to its permanent collection of microorganisms as NRRL #2401.

In addition to the activity demonstrated by the above table, we have found that acetopyrrothine is quite active against a strain of A. aerogenes which has been made resistant to aureomycin and chloramphenicol, and that it also is active against a strain of A. aerogenes which has been made resistant to streptomycin and streptothricin. In addition to the above organisms, acetopyrrothine shows great activity against a number of differ-

| Medium | S. albus Waksman's description | S. albus ATCC 618 (Kluyver) | S. albus ATCC 3004 (Waksman) | S. albus Our Isolate |
|---|---|---|---|---|
| Glucose-asparagine agar. | No data | Sporulation good | Sporulation good | Sporulation very slight. |
|  | ____do____ | Reverse brown | Reverse light brown | Reverse light brownish yellow. |
|  | Spirals | Spirals | Few spirals | No spirals. |
|  | Spores $1\mu$ long, ellipsoidal. | Spores $0.65 \times 1.0$–$1.2\mu$, short cylindric. | Spores $0.65$–$1.0 \times 1$–$1.3\mu$; short cylindric. | Spores $0.65 \times 0.9\mu$, short cylindric. |
| Gelatin | No data | Poor growth | Moderate growth | Moderate growth. |
|  | Liquefaction | Slight liquefaction | Moderate liquefaction | Moderate liquefaction. |
|  | No soluble pigment | No soluble pigment | No soluble pigment | Yellow soluble pigment. |
| Glucose agar | Aerial mycelium, gray becoming brownish. | White aerial mycelium | White aerial mycelium | Pale Quaker Drab (R) Sporulation. |
| Nutrient agar | No data | No soluble pigment | No soluble pigment | Pigment faint yellow. |
| Potato plug | Aerial mycelium, white | Aerial mycelium, white | Aerial mycelium, white | Aerial mycelium near Pale olive Buff (R). |
| Calcium malate | Growth, moderate | Growth, moderate | Growth, moderate | Growth, poor. |
| Starch plates | No data | Growth, poor | Growth, moderate | Growth, poor. |
|  | No hydrolysis | No hydrolysis | Weak hydrolysis | Moderate hydrolysis. |
| Synthetic agar | No data | Aerial mycelium, white | Aerial mycelium, white | No aerial mycelium. |
| Cellulose | No growth | No growth | Slight growth | No growth. |
| Emerson's agar | No data | No soluble pigment | Light yellow soluble pigment in two tubes, none in four. | Orange brown soluble pigment. |
| Nitrate broth | Nitrites produced | No reduction | No reduction | No reduction. |

In addition to the differences tabulated above, we have found that our new antibiotic, acetopyrrothine is not produced, when S. albus ATCC 618 and S. albus ATCC 3004 are grown under the same conditions that produce the antibiotic, when our new strains of S. albus are used.

It is to be understood that for the production of acetopyrrothine we do not wish to limit ourselves to this particular organism or to organisms which exactly conform to the above description, which is merely given for illustrative purposes. We have shown that several other strains of S. albus also produce acetopyrrothine and we especially wish to include the use of organisms which are mutants produced from the above-described organism by such agents as X-radiation, ultraviolet radiation, nitrogen mustards, etc.

Acetopyrrothine has a considerable activity against a variety of microorganisms, particularly those of the Gram negative class, and various fungi. The following table illustrates the activity of our new antibiotic against a representative group of microorganisms. The tests were conducted by streaking standard cultures of the microorganisms on agar which contain various concentrations of the crystalline antibiotic. The values given in the table are those concentrations of acetopyrrothine in mcg./ml. of agar, which will just suffice to inhibit completely the growth of the various microorganisms listed.

| Organisms | Acetopyrrothine Concentration in mcg./ml. |
|---|---|
| A. aerogenes | 7.5 |
| E. coli | 5 |
| Ps. aeruginosa | 200 |
| Monilia albicans | 5 |
| E. typhosa | 2.5 |
| K. Pnuemoniae | 10.0 |
| S. paratyphi A | 5 |
| S. aureus | 5 |
| B. subtilis | 1 |
| S. faecalis | 15 |
| Br. bronchiseptica | 50 |
| S. paradysenteriae | 5 |
| Staph. albus | 5 |
| Proteus sp. | 2.5 |
| Trichophyton gypseum | <3 |
| Candida albicans | 5 | ent fungi, many of them pathogenic. This combination of activity against both bacteria and fungi is unusual among antibiotics and is particularly useful in the case of infections from mixtures of undetermined organisms.

In general, acetopyrrothine is somewhat less active than oxytetracycline, but it is equal to, or more active than, streptomycin against bacteria. The high antifungal activity is evident from the data presented demonstrating that Trichophyton gypseum and Candida albicans strains were completely inhibited by 5 micrograms per ml. or less.

In view of the strong activity against many Gram-negative and Gram-positive bacteria, the activity of acetopyrrothine against certain acid-fast bacteria was of interest. Four such strains of Mycobacterium were tested. The results are summarized in the following table.

|  | Acetopyrrothine in mcg./ml. | | |
|---|---|---|---|
|  | 1 | .5 | .10 |
| Mycobacterium ranae | + | − | − |
| Mycobacterium phlei | + | − | − |
| Mycobacterium smegmatis | + | − | − |
| Mycobacterium #607 | + | ± | − |

+ = growth of test organism.
− = complete inhibition.
± = doubtful growth.

Whereas the four Mycobacterium strains were not inhibited by 1 microgram of acetopyrrothine per ml., three were completely inhibited by .5 micrograms per ml. In the case of Mycobacterium 607 questionable results were obtained at the .5 microgram level, but complete inhibition was obtained when 10 micrograms were used.

As a further demonstration of the antifungal power of acetopyrrothine, several additional strains of pathogenic fungi were tested by the agar streak method. The minimum amount of acetopyrrothine effecting complete inhibition was not determined, but the data in the following indicate a high degree of activity. All strains of human pathogens tested were completely inhibited by 5 micrograms per ml., but not by 1 microgram per ml.

|  | Acetopyrrothine in mcg./ml. | | |
|---|---|---|---|
|  | 1 | 5 | 10 |
| Histoplasma capsulatum | + | − | − |
| Blastomyces brasiliensis | + | − | − |
| Sporotrichum schenkii | + | − | − |
| Phialophora verracosa | + | − | − |
| Trichophyton violacium | + | − | − |
| Trichophyton sulfureum | + | − | − |
| Microsporum canis | + | − | − |
| Cryptococcus neoformans | + | − | − |

+ = Growth of test organism.
− = No growth of test organism.

The following table presents data showing the activity of acetopyrrothine against ten strains of phytopathogens. The Alternaria, Septoria, Endothia and Nematospora cultures were effectively inhibited by 5 micrograms of acetopyrrothine per ml. The relative resistance exhibited by the Neocosmospora and Fusarium cultures was unexpected in view of the general high order of activity against fungi. The two phytopathogenic bacteria, Phytomonas tumefaciens and Erwinia amylovora also required more acetopyrrothine than most of the other bacteria reported above.

|  | Acetopyrrothine in mcg./ml. | | | | |
|---|---|---|---|---|---|
|  | 1 | 5 | 10 | 20 | 50 |
| Alternaria solani #1 | + | − | − | − | − |
| Alternaria solani #2 | + | ± | − | − | − |
| Botrytis allii | + | + | − | − | − |
| Septoria nodorum | + | − | − | − | − |
| Endothia parasitica | + | − | − | − | − |
| Neocosmospora vasinfecta | + | + | + | + | − |
| Fusarium oxysporium | + | + | + | ± | − |
| Nematospora corylii | + | − | − | − | − |
| Phytomonas tumefaciens | + | + | + | + | − |
| Erwinia amylovora | + | + | + | ± | − |

+ = Growth.
− = No growth.
± = Doubtful growth.

Crystalline acetopyrrothine has been compared with other antibiotics using standard test methods. It has been found that when the antibacterial activity of acetopyrrothine is measured by a culture of K. pneumoniae it is found that 1 mg. is as effective as 260–280 mg. of chloramphenicol. When a standard culture of Escherichia coli was used as the test organism, it was found that crystalline acetopyrrothine has the equivalent of 560 E. coli dilution units per mg. Using the same type of test, but substituting the organism Trichophyton gypseum, it was found that our new antibiotic has 560 Trichophyton dilution units per milligram activity. In routine testing we employ a standard strain of Bacillus subtilis in a cylinder plate assay similar to that used in the Oxford assay for penicillin. The crystalline antibiotic is assigned a potency of 1000 units per mg. as a standard.

Our invention includes processes for growing our new strain of S. albus. The microorganism may be cultivated at temperatures ranging from about 23° C. to about 32° C. However, we prefer to use temperatures of from 26° C. to 30° C. The organism is best grown under submerged condition of agitation and aeration on media containing a carbohydrate source, such as sugars, starch and glycerol; an organic nitrogen source, such as soybean meal, cotton seed meal, peanut meal, and corn steep liquor; and mineral salts, such as sodium chloride, sodium nitrate, magnesium sulfate, and potassium phosphate. In addition to these, a buffering agent, such as calcium carbonate or potassium dihydrogen phosphate, and a foam preventer, such as vegetable oils or animal oils, may be used. We prefer to maintain the pH in the range of from about 6 to about 7. If the medium is adjusted to this point before fermentation, there is little change during the course of production of the antibiotic. During fermentation the broths are agitated with stirrers of suitable design for incorporating air therein, and they are aerated at the rate of about one-half to two volumes of air per volume of broth per minute. In general, about two days to a week are required for the fermentation broths to reach the maximum antibiotic potency.

Inoculum may be obtained by employing a growth from slants or Roux bottles inoculated with our strain of S. albus. Suitable solid media for this initial growth are beef-lactose or Emerson's agar. This growth is used to inoculate either flasks or inoculum tanks. The time required to reach maximum growth will vary somewhat within the period given above. When inoculum tanks are used, the final broth containing a large amount of fungus is used to inoculate the fermenters.

After the fermentation broth has reached a suitable antibiotic potency, the mycelium is filtered. This may be done without adjustment of the pH, but it has been found that a somewhat higher yield of the antibiotic may be obtained by acidifying the whole broth, heating it and then filtering. We prefer to use a pH of about 2 for this operation and to heat the whole broth for from ten minutes to an hour at about 70–90° C. A filter-aid such as Super-cel is preferably added to the mixture. The pH is raised slightly and the mycelium is removed by means of a filter press or other suitable equipment. The filtered broth so obtained may be used as such, or it may be spray dried to give a product which may be used for local application, but we prefer to purify the material to some extent before using it therapeutically.

Not only is our new antibiotic highly active against a variety of microorganisms but, in addition, it possesses a considerable degree of stability. This, of course, enhances its value as a therapeutic agent in the treatment of various diseases, since it may be prepared in dry form and stored for considerable periods without appreciable loss. The utility of Thiolutin in human and veterinary therapy has not as yet been demonstrated. We have determined the stability of the antibiotic in the broth that results from the growth of S. albus in a standard culture medium. This determination has been made at acid, neutral and basic pH's, and at both room temperature and 100° C. The following table gives the results of this determination expressed as percentage of activity retained:

|  | Room Temperature (60 minutes) | 100° C. (15 minutes) |
|---|---|---|
| pH 2 | 100 | 99 |
| pH 6.5 | 96 | 78 |
| pH 9.0 | 67 | 50 |

It will be noticed that the new antibiotic has higher stability in the lower pH range.

Acetopyrrothine may be recovered by various methods from the dilute aqueous solutions produced by fermentation, the most convenient being that of solvent extraction. We have found that practically all of the antibiotic may be removed from the filtered fermentation broth by extraction with water-immiscible, organic solvents, particularly alcohols, esters, ketones, hydrocarbons, ethers and chlorinated organic solvents, at either acid, neutral or basic pH's. Solvents which we have found particularly useful are butanol, ethyl acetate, methyl isobutyl ketone, benzene and chloroform. Extraction may be carried out at any reasonable pH, but we prefer neutral or somewhat acid conditions. By concentration of such organic solvent extracts we may obtain dry preparations of our antibiotic. Materials of this type may be used as such or the antibiotic may be crystallized from several different solvents, including the lower alcohols, the lower ketones and dimethylformamide or from mixtures of these solvents with water. We prefer to use methanol for this purpose. The amorphous product is dissolved in the hot solvent, filtered to remove insoluble impurities, and allowed to cool slowly. The pure antibiotic separates in the form of brilliant yellow, needle shaped crystals. The crystalline solid may then be separated from the mother liquor by filtration. Further material may be recovered by concentrating the mother liquors, or by adding water. The antibiotic may also be recovered by adsorption of the active material on adsorbents such as activated carbon, followed by elution with a solvent. The compound may also be purified by sublimation at an elevated temperature under vacuum.

Pure crystalline acetopyrrothine is slightly soluble in water. At room temperature saturated water contains about 120 micrograms of acetopyrrothine per milliliter. It is more soluble in organic solvents, such as butanol, methanol, ethanol, acetone, methyl isobutyl ketone, glacial acetic acid, dimethylformamide, and chloroform. However, its solubility in ethyl ether, petroleum ether, benzene and hexane is more limited. Acetopyrrothine is a neutral compound. Averaged analyses of samples of the crystalline compound indicate the following composition for acetopyrrothine: 42.09% carbon, 3.53% hydrogen, 12.28% nitrogen, 28.07% sulphur and (by difference) 14.03% oxygen. Based on these analyses we have assigned the formula $C_8H_8N_2O_2S_2$ to this antibiotic and determined that it is probably 3-acetamido-5-methyl pyrrolin-4-ono-(4,3-d)-1,2-dithiole. The high sulfur content of this acetopyrrothine is a noteworthy characteristic and exceeds that of penicillin, gliotoxin, and sulfactin, other sulfur-containing antibiotics.

The new product is believed to have the structural formula

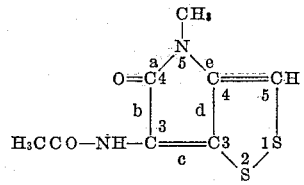

The method used for naming this fused ring system follows that recommended in Chemical Abstracts, vol. 39, pp. 5867–5975 (1945).

The ultraviolet absorption spectrum of the pure antibiotic in 0.1M $KH_2PO_4$ solution (pH 4.5) containing 2% methanol displays at least two distinct maxima. They occur at the following wave lengths: 384 m$\mu$, 314 m$\mu$. The ultraviolet absorption spectrum also displays a shoulder at 245 m$\mu$. The infrared absorption spectrum of the crystalline antibiotic was determined with mulls of the compound in mineral oil and in Fluorolube-S (a commercially available highly fluorinated hydrocarbon). It displays a number of characteristic absorption bands. Among these are the following, the frequencies of which are expressed in reciprocal centimeters (cm.$^{-1}$): 3295, 3220, 3110, 1680, 1645, 1607, 1551, 1439, 1322, 1239, 1138, 1091, 1060, 1039, 975, 875, 800, 740, 729. The accompanying drawing is illustrative of the infrared spectrum.

Crystalline acetopyrrothine has no definite melting point up to 270° C., but there is evidence of decomposition at temperatures somewhat lower than this point. The crystals darken at about 255° C. An 0.25% solution of the pure antibiotic in glacial acetic acid displays no apparent optical rotation.

It is to be understood that all of the physical constants and analyses reported above are subject to a certain amount of error. Other investigators may find values differing slightly from these.

The following specific examples serve to illustrate how one may carry out our invention, but it is, of course, not limited to the details given therein.

*Example I*

A fermentation medium of the following composition was prepared:

| | G. |
|---|---|
| Cerelose (commercially available hydrated dextrose) | 10 |
| Corn starch | 10 |
| N-Z-amine B (enzymatic digest of casein) | 5 |
| Curbay (butanol-molasses fermentation residue) | 5 |
| Sodium chloride | 5 |
| Soybean meal | 15 |
| Calcium carbonate | 1 |

The above materials were made up to one liter with tap water and the pH was adjusted to 7 with a sodium hydroxide solution.

500 cc. quantities of the above medium were disposed into Fernbach flasks, and, after stoppering with cotton, the media and apparatus were sterilized for 45 minutes at 121° C. Each of the flasks was then inoculated with 5 ml. of a vegetative culture of one of our new strains of *S. albus* obtained by propagating the mold in 300 ml. Erlenmeyer flasks at 28° C. for 48 hours on a rotary shaker. The 300 ml. Erlenmeyer flasks had in turn been inoculated from agar slants.

After the fermentation had proceeded for four days, while continuously shaking the Fernbach flasks, the resultant broths were treated with a filter-aid and filtered. The filtered fermentation broths were each found to contain about 75 mcg./ml. of acetopyrrothine.

*Example II*

A fermentation broth produced by four days' growth of one of our new strains of *S. albus* on the same medium as in Example I, at about 28° C. in shaking flasks, was filtered with the aid of Super-cel. The filtrate continued about 75 mcg. of antibiotic per ml. Sufficient solution was pooled to give a volume of 19 liters of clarified broth. This was extracted two times with 4-liter portions of chloroform. The chloroform extracts were dehydrated with sodium sulfate and were then evaporated to dryness under vacuum. The yellow, amorphous residue was heated in 900 ml. of methanol, and the hot solution was filtered. Crystalline acetopyrrothine immediately started to separate from the methanolic solution. The mixture was stored overnight in a refrigerator, and the crystals were then removed from the supernatant liquor by filtration. The crystalline antibiotic had the equivalent of 280 mcgs. of chloramphenicol per mg. After two recrystallizations from methanol, the product weighed 230 mgs. representing a recovery of about 16% of the material in the original, clarified fermentation broth.

*Example III*

| | G. |
|---|---|
| Corn starch | 10 |
| Corn steep liquor (50% solids) | 10 |
| Diammonium hydrogen phosphate | 2 |
| Potassium dihydrogen phosphate | 2 |
| Magnesium sulfate heptahydrate | 0.25 |
| Calcium carbonate | 1 |

The above amounts of materials were used in a volume made to one liter with tap water.

A suitable volume of the above medium was dispensed into small pots equipped for agitation and aeration. After sterilization, each pot was treated with a small volume of a 48-hour inoculum of an active strain. The pots were stirred at 27° C. to 29° C. and aerated with one volume of air per volume of medium. The potency was determined from time to time, and after four days the product was harvested. The mycelium-free filtrate was found to contain about 90 mcg./ml. of acetopyrrothine.

*Example IV*

150 gallons of a fermentation broth from a three day, aerated, submerged fermentation with one of our new strains of *S. albus* and using the same medium as in Example III was adjusted to pH 2 with sulfuric acid and was heated to 90° C. for 20 minutes. A filter-aid was added, the pH was adjusted to 3.5, and the mixture was then filtered. The so clarified broth was extracted with one-quarter its volume of methyl isobutyl ketone, in a Podbielniak continuous extractor. The organic extract was then concentrated under vacuum to a small volume (2 liters). The amorphous acetopyrrothine which thereupon separated was filtered. This material was crystallized by dissolving it in the minimum volume of hot methanol, filtering and cooling.

It is to be understood that the composition of the culture medium and the conditions of fermentation may be varied within relatively wide limits. Furthermore, many alternative methods for recovering, concentrating and purifying our new antibiotic will be apparent to those skilled in the art. All such obvious modifications in carrying out the present invention are included within the spirit and scope thereof. The patent protection sought is to be limited only as required by the express language of the claims.

We claim:
1. The process for producing acetopyrrothine, which comprises cultivating a pigment-producing strain of *Streptomyces albus* in NRRL #2401 in an aqueous, nutrient-containing, carbohydrate solution under aerobic conditions, until substantial antibacterial activity is imparted to said solution.

2. A process for producing acetopyrrothine, which comprises cultivating a pigment-producing strain of *Streptomyces albus* NRRL #2401 under submerged aerobic conditions in an aqueous nutrient medium containing mineral salts, a carbohydrate and an organic nitrogen source, at a temperature ranging from about 23° C. to about 32° C., for a period of from about two days to a week, and then recovering the acetopyrrothine formed from the fermentation broth.

3. A process as claimed in claim 2, wherein the recovery of the acetopyrrothine includes the step of extracting the fermentation broth with an organic water-immiscible solvent.

4. A process as claimed in clam 2, wherein the fermentation broth is acidified, heated and filtered to remove the mycelium, prior to the recovery of the acetopyrrothine from the clarified broth.

5. A new antibiotic identified as acetopyrrothine that is effective against bacteria and fungi, neutral, slightly soluble in water, contains approximately 42.09% carbon, 3.53% hydrogen, 12.28% nitrogen, 28.07% sulphur and (by difference) 14.03% oxygen, and whose mineral oil suspension exhibits a number of characteristic absorption bands in the infrared region of the spectrum among which are the following frequencies expressed in reciprocal centimeters: 3295, 3220, 3110, 1680, 1645, 1607, 1551, 1439, 1322, 1239, 1138, 1091, 1060, 1039, 975, 875, 825, 800, 740, 729.

References Cited in the file of this patent

UNITED STATES PATENTS

| Number | Name | Date |
|---|---|---|
| 2,378,449 | Tishler | June 19, 1945 |

OTHER REFERENCES

Waksman: Microbial Antagonists and Antibiotic Substances, 1947, The Commonwealth Fund, pp. 111, 113, 118.

Alexopoulos: Ohio J. Sc. (1941), 41:425–430.

Alexopoulos and Herrick: Bull. Torrey Bot. Club (1942), 69:257–261.

Welch: Jour. Bact. (1942), 43, page 10, QR, 1, J8.

Kocholaty, in J. Biol. Chem., vol. 168, May 1947, pages 765–769.

Anker, in J. Bact., February 1948, pages 249–255.

Leben, on Antimycin in Phytopathology, vol. 38, November 1948, pages 899–906.

Pratt et al.: Antibiotics (1950), pages 40–41.